United States Patent [19]
Lampert et al.

[11] Patent Number: 5,638,474
[45] Date of Patent: Jun. 10, 1997

[54] ANTI-SNAG LATCH ASSEMBLY FOR A CONNECTOR

[75] Inventors: Norman R. Lampert, Norcross, Ga.; George J. Shevchuk, Old Bridge, N.J.; William D. Smith, Marietta, Ga.

[73] Assignee: Lucent Technologies Inc., Murray Hill, Del.

[21] Appl. No.: 520,808

[22] Filed: Aug. 30, 1995

[51] Int. Cl.$^6$ .................................................. G02B 6/36
[52] U.S. Cl. ........................................ 385/78; 385/136
[58] Field of Search ............................ 385/76, 55, 56, 385/60, 77, 78, 139, 136

[56] References Cited

U.S. PATENT DOCUMENTS

| | | | |
|---|---|---|---|
| 3,860,316 | 1/1975 | Hardesty | 339/91 R |
| 4,241,974 | 12/1980 | Hardesty | 339/154 A |
| 4,611,875 | 9/1986 | Clarke et al. | 339/154 A |
| 5,224,186 | 6/1993 | Kishimoto et al. | 385/78 |
| 5,419,717 | 5/1995 | Abendschein et al. | 385/76 |
| 5,461,690 | 10/1995 | Lampert | 385/76 |
| 5,481,634 | 1/1996 | Anderson et al. | 385/76 |

*Primary Examiner*—John Ngo
*Attorney, Agent, or Firm*—Michael A. Morra

[57] ABSTRACT

A connector (10) terminates an optical cable (30) and includes a cylindrical ferrule (140) installed in a plastic base member (150) to form a fiber-holding structure. This structure includes a small passageway along its central axis for holding an optical fiber, and is mounted within a housing (110) that includes a cable-entrance end for receiving the optical cable and a plug end for insertion into a jack receptacle (40). The housing includes a cantilever latch (120) that is mounted on a side surface of the housing and is used to secure the connector to the receptacle. The fixed end (125) of the cantilever latch is positioned toward the plug end of the connector, and the free end (124) of the cantilever latch extends toward the cable-entrance end of the connector. The housing further includes a cantilever trigger (130) which slidably engages the latch to move it downward and thereby release the connector from the receptacle. The fixed end (135) of the trigger is positioned toward the cable-entrance end of the connector and the free end (134) of the cantilever trigger extends toward the plug end of the connector. The trigger forms an acute angle ($\beta$) with the central axis (101) of the housing that points in a direction away from the plug end of the connector toward the cable-entrance end so that when the cable is pulled backward through a concentrated area of cables and wires, the trigger prevents the latch from snagging. The novel anti-snagging feature is also incorporated into an RJ-type electrical connector (800).

16 Claims, 7 Drawing Sheets

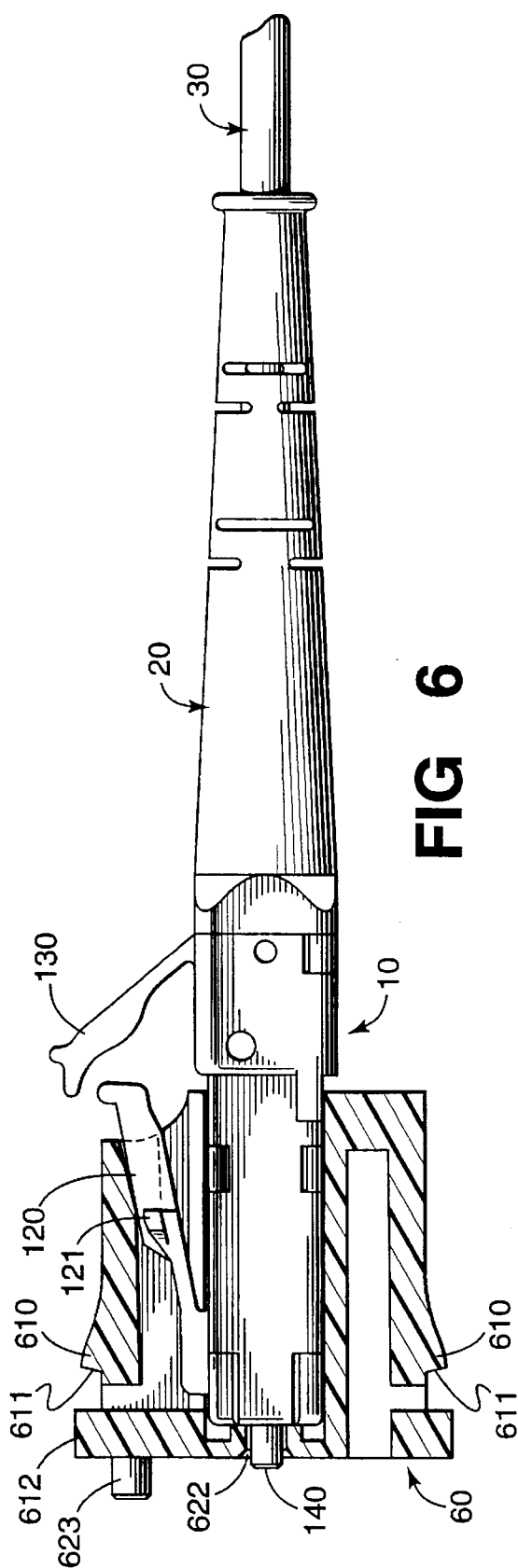
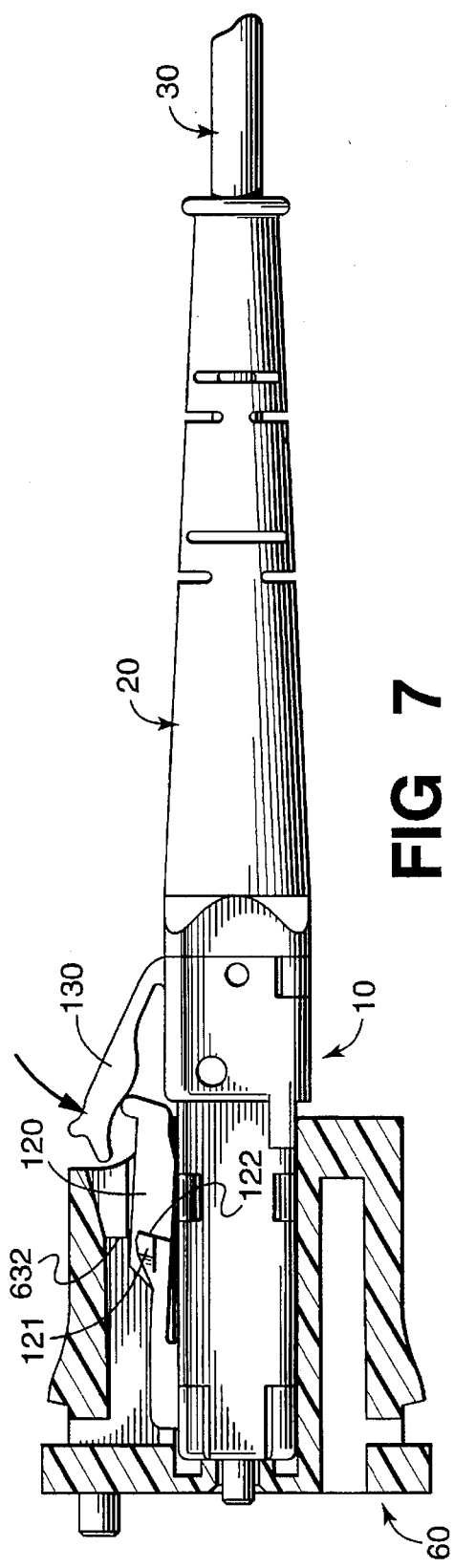

ANTI-SNAG LATCH ASSEMBLY FOR A CONNECTOR

REFERENCE TO RELATED APPLICATIONS

This invention is related U.S. Pat. No. 5,481,634 to J. M. Anderson et al. filed on Jul. 29, 1994; and to U.S. Ser. No. 08/520,809 to N. R. Lampert et al., now U.S. Pat. No. 5,579,425, filed concurrently with this patent application.

TECHNICAL FIELD

This invention relates to a connector which terminates an optical or electrical cable, and which avoids snagging when being pulled by the associated cable.

BACKGROUND OF THE INVENTION

Telephone switching offices and companies using a large number of communication devices such as modems, telephones, facsimile machines and the like are all faced with the problem of interconnecting these devices with electrical and/or optical cables. Such cables frequently reside within ducts or troughs that contain a large number of similar cables. Each cable terminates in a plug to facilitate the interconnection process. As devices are replaced, or as new interconnections are required, these cables need to be removed from the duct and replaced by others. And while adding cables to a duct is not a particularly difficult task, removing them is. Indeed, removal is accomplished by disconnecting the plug from the communication device and pulling it backwards (i.e., by its associated cable) through the duct. Since it is not desirable to sever the plug from the cable, the plug needs to be streamlined in order to avoid snagging other cables as it is pulled. Imagine, for example, the difficulty associated with pulling a plug, shaped like a fishhook, through a maze of wires; and yet the most popular plug used in the communication industry is shaped that way. (Perhaps the most widely used and accepted are know as "RJ-type" plugs which are used on all telephones and disclosed in numerous patents including U.S. Pat. No. 3,860,316 to Edwin C. Hardesty.) These plugs have achieved overwhelming acceptance by customers because they are inexpensive, reliable, and their operation is intuitively understood.

RJ-type plugs include a locking tab (hereinafter "cantilever latch" or "latch") for interlocking with an associated jack; but the latch snags other wires and cables when being pulled backwards through a concentrated area of wires and cables as though it were designed for this nefarious purpose. This difficulty is exacerbated by the fact that the use of such modular plugs is growing (such plugs are now designed to accommodate high speed electrical data communication). Today, even optical plugs are being designed in this same general style.

To some extent, the "snagging" problem has been overcome by incorporating a pair of sloped sidewalls at the back end of the plug. This feature is commercially available from AT&T in its "Snagless RJ-45 Plug," and is incidentally shown in U.S. Pat. No. 4,611,875. However, such sidewalls need to be taller than the free end of the latch which must be deflected downward in order to release the plug from an associated receptacle. These sidewalls are relatively close together and it is difficult to manually deflect the latch because there is little room for a user's finger. As the desire for greater connection density grows, particularly in telephone connecting panels, future plugs will need to be smaller and sidewalls will unacceptably interfere with the customer's ability to operate the plug.

Sidewalls have also been adapted for use in optical connectors—one of which is shown in U.S. Pat. No. 5,224,186. In this optical connector, the sidewalls appear to be part of the fixed end of the cantilever latch itself, so the user's finger doesn't need to be inserted between the sidewalls. However, this style of connector is undesirable for other reasons. Because the fixed end of the cantilever latch is located at the cable-entrance end of the plug, the mechanical advantage associated with the cantilever is exactly opposite the desired mechanical advantage. That is, the user is required to exert a relatively large actuating force near the fixed end of the cantilever in order to deliver a relatively small latching force at its free end.

What is needed and, seemingly, what is unavailable in the prior art, is a connector for terminating an electrical or optical cable that resists snagging when it is pulled backwards through a concentrated area of wires and cables. Desirably, this connector should be inexpensive to manufacture and be easy to manually operate when miniaturized in size. Moreover, this connector should remain easy to manually operate when installed in a dense array (i.e., side-by-side) of similar connectors.

SUMMARY OF THE INVENTION

The foregoing problems of the prior art are overcome by a connector in accordance with the invention which terminates a cable containing a transmission medium. The connector includes a plug end for insertion into a mating receptacle, a cable-entrance end for receiving the cable, a latch for securing the connector to the receptacle, and a trigger for engaging the latch to release the connector from the receptacle. The latch comprises a cantilever mounted on an outside surface of the connector—its fixed end being positioned toward the plug end of the connector and its free end extending toward the cable-entrance end thereof. The trigger comprises a cantilever which is also mounted on the outside surface of the connector—its fixed end being positioned toward the cable-entrance end of the connector and its free end extending toward the plug end thereof. The free end of the trigger slidably engages the free end of the latch to move it downward. The trigger forms an acute angle with a central axis of the connector that points in a direction away from the plug end of the connector toward the cable entrance end, thereby avoiding snagging.

In one illustrative embodiment of the invention, the transmission medium is an optical fiber, and the connector is an optical plug comprising a fiber-holding structure and a housing.

In another illustrative embodiment of the invention, the transmission medium includes a number of metallic wires, and the connector is an electrical plug comprising a dielectric housing that holds a like number of spaced-apart electrical conductors.

BRIEF DESCRIPTION OF THE DRAWING

The invention and its mode of operation will be more clearly understood from the following detailed description when read with the appended drawing in which:

FIG. 6 is a side view of the connector installed within a receptacle, the latch being shown in its locked state;

FIG. 7 is a side view of the connector shown in FIG. 6, the latch being shown in its released state;

DETAILED DESCRIPTION

Figure 1:
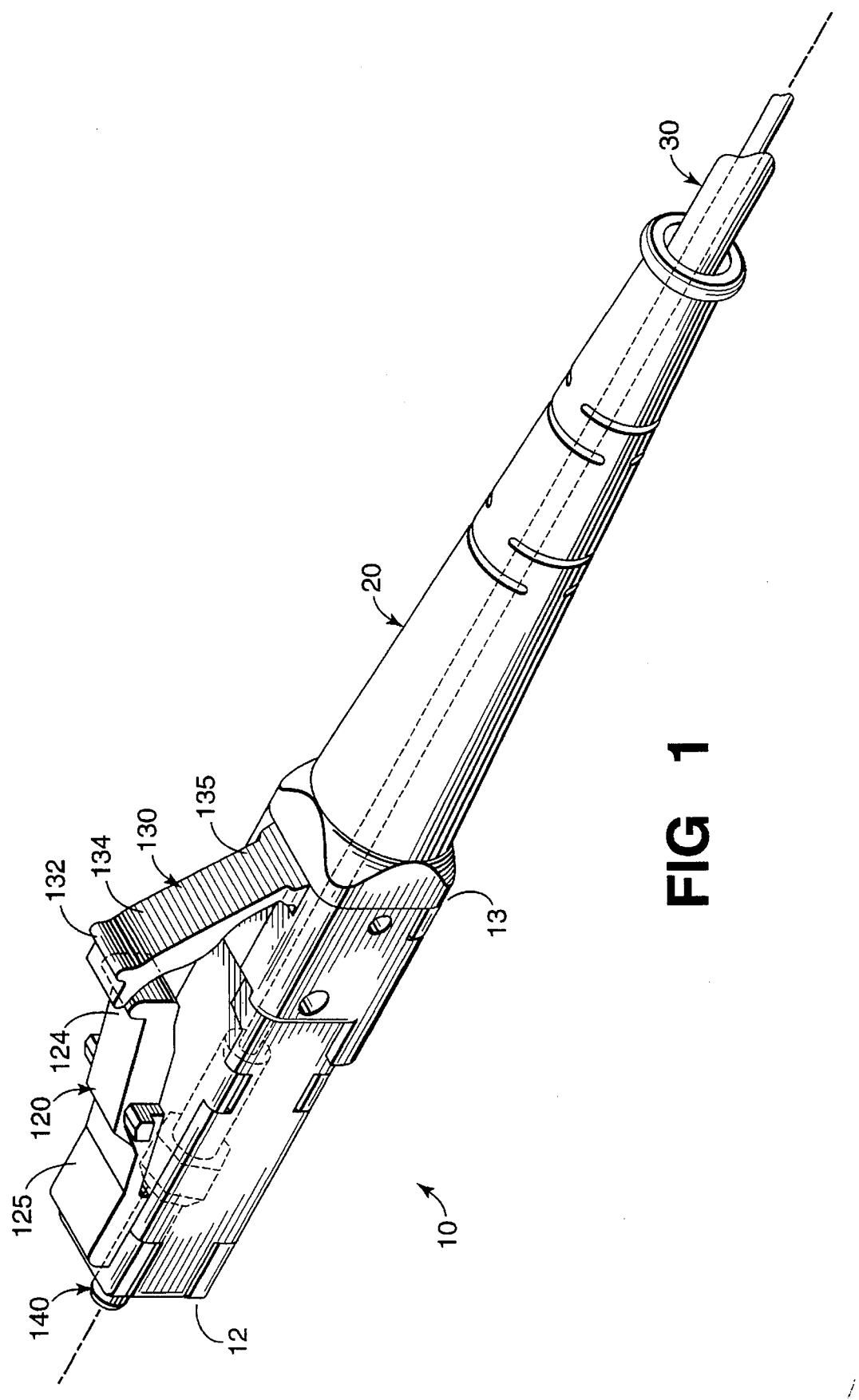
FIG. 1 is a rear, top and left-side perspective view of an embodiment in which the connector comprises a plug that terminates an optical cable and includes an anti-snag latch assembly.

Reference is made to FIG. 1 which shows a rear, top and left-side perspective view of an optical fiber connector 10 which, together with bend-limiting strain-relief boot 20, terminates optical cable 30. Connector 10 includes a plug end 12 which is inserted into a jack receptacle, and a cable-entrance end 13 which receives the optical cable. An optical connection is made, for example, by butting the end face of ferrule 140 up against the end face of another ferrule which is precisely aligned with it. The outside surface of the connector 10 includes a latch 120 for securing the connector to a jack receptacle in order to prevent unintended decoupling therebetween. Latch 120 is molded into the connector and includes a "living hinge" which allows it to be moved up and down in a direction that is perpendicular to a central axis 101 of the connector (see FIG. 5). Similarly, a trigger 130 is molded into the connector and includes a living hinge which allows it to be moved up and down in a direction which is perpendicular to the central axis 101 of the connector. Latch 120 and trigger 130 are cantilever beams whose longitudinal axes reside in the same plane that includes the central axis of the connector. Each of these cantilever beams includes a fixed end 125, 135 and a free end 124, 134; and their free ends are arranged to interact with each other. When trigger 130 is depressed, its free end 134 engages the free end 124 of latch 120 in order to release the connector 10 from a jack receptacle 40 (see FIG. 2). The free end of trigger 130 is positioned above the free end of latch 120 so that when the trigger is depressed, its free end 134 slides over the free end 124 of the latch and urges it downward. Significantly, the trigger facilitates activation of the latch by effectively extending its length. Trigger 130 extends in a direction which is parallel to the central axis of the connector, and can be made relatively narrow so that when connectors are positioned side-by-side in a dense array, each individual trigger can be manually accessed with minimum interference from an adjacent trigger. More importantly, the trigger 130 is sloped in a manner that prevents snagging when pulled backward (by cable 30) through a concentrated area of wires and cables.

In this illustrative embodiment of the invention, the connector 10 has a footprint (cross-section dimension) of only 4.6 by 4.6 millimeters (mm), and a large number of such connectors can be grouped in a compact array. In this regard, reference is made to FIG. 2 which discloses a quadruplex jack receptacle 40 that accommodates up to four individual connectors 10. The front side of jack receptacle 40 is shown protruding through panel 200 which may be of any particular shape. Receptacle 40 installs in a rectangular opening of the panel 200 by pushing its narrow end through the opening. The receptacle is held therein by latches 410, and may be removed from the panel by squeezing these latches and pushing the receptacle 40 toward the panel 200. Greater detail is presented in FIG. 6 and 7 regarding the manner in which a connector is held within, and removed from, a receptacle.

Figure 2:
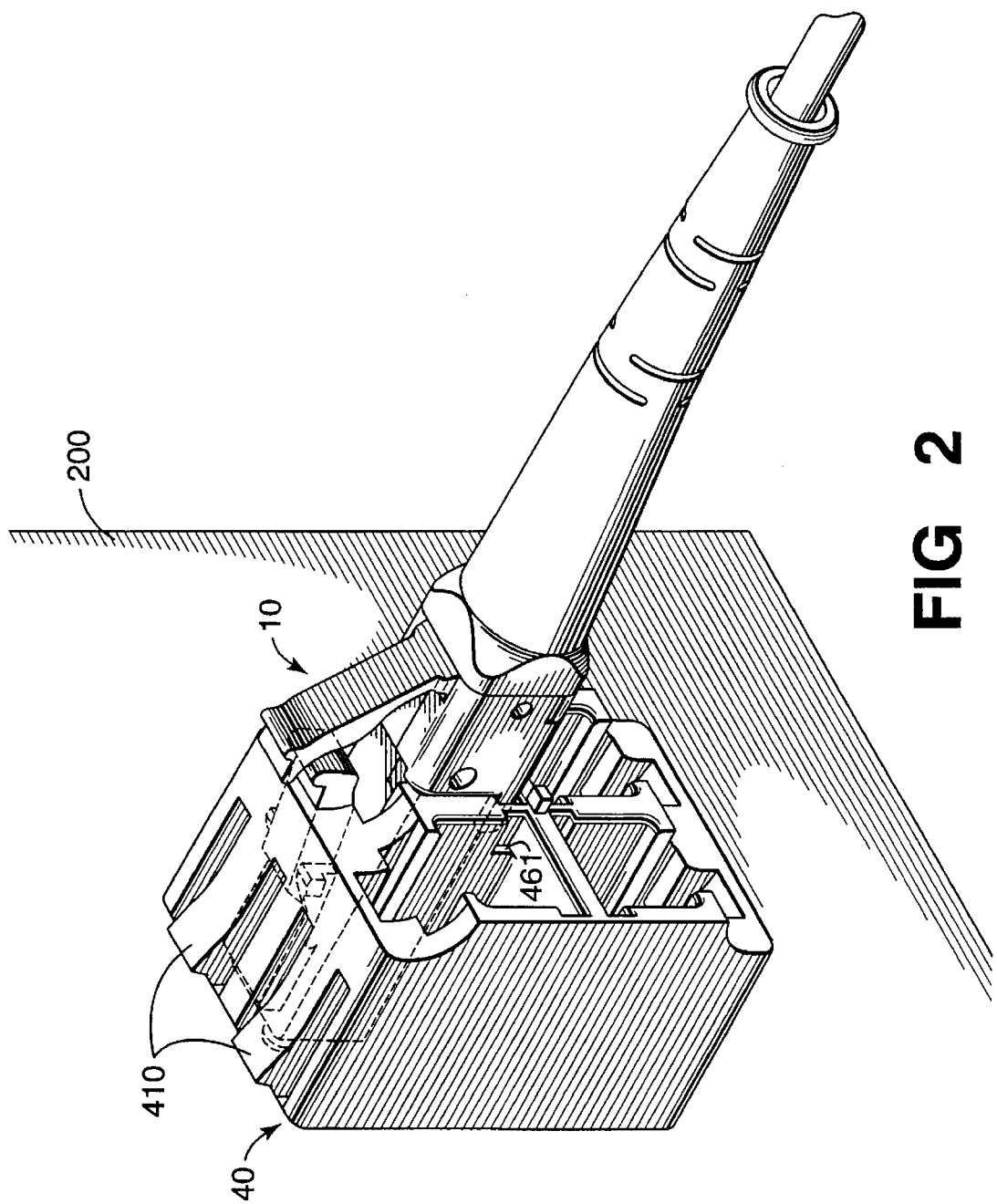
FIG. 2 shows the connector of FIG. 1 inserted into a receptacle.
Figure 3:
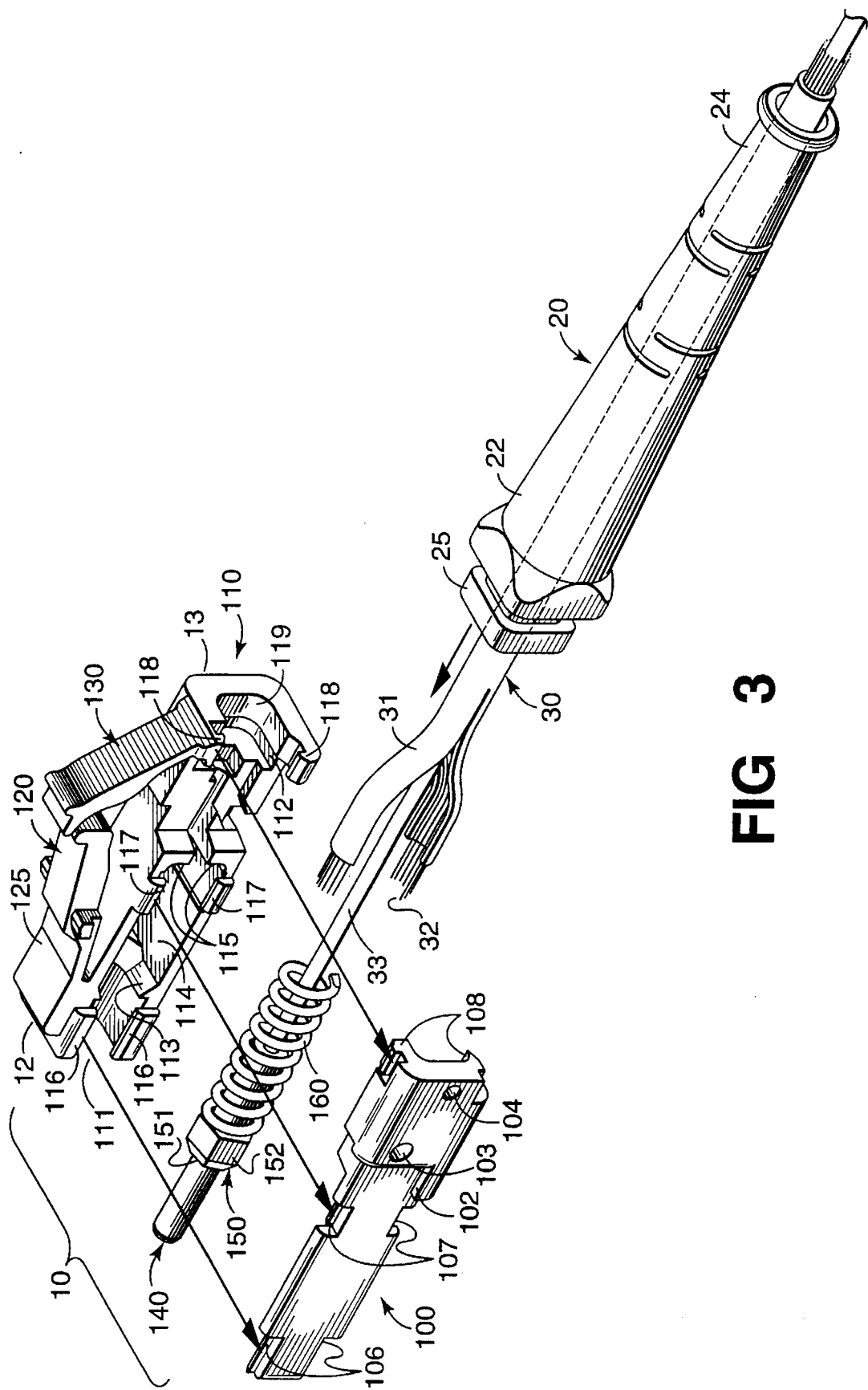
FIG. 3 is an exploded perspective view of the connector shown in FIG. 1, illustrating its associated components.

FIG. 3 is an exploded perspective view of the connector shown in FIG. 1, illustrating its associated components. In particular, FIG. 3 discloses construction details of a connector 10 which includes housing 110, cover 100, and a fiber-holding structure comprising ferrule 140, base member 150, and spring 160 which is disposed about the base member. Although the fiber-holding structure is shown as a two-piece assembly, it can be a one-piece unit. Housing 110 is a generally U-shaped structure having a first cavity 114 at its front end for receiving the fiber-holding structure, and having a second cavity 112 at its back end for receiving a flange 25 on a strain relief boot 20. The cover 100 is joined to the housing 110 after the fiber-holding structure and the flange are installed therein. Cover 100 includes snap features 106–108 that interlock with mating snap features 116–118 on housing 110. Once locked together, the front end of the connector has a generally square shape which fits into a receptacle 40 (FIG. 2) that is shaped to receive same. The connector 10 includes a first opening 119 at its cable-entrance end 13 which receives an optical cable 30, and a second opening 111 at its plug end 12 for enabling the end face of the fiber-carrying structure to protrude therethrough. These openings 111, 119 respectively extend into cavities 114, 112 and are positioned at opposite ends of connector 10. Housing members 100, 110 are molded from a thermoplastic material such as polycarbonate. The latch 120 and trigger 130 are molded into the housing 110.

Cylindrical ferrule 140 is held within a mating opening of base member 150. A compression spring 160 surrounds the back portion of the base member, and simultaneously presses against an interior surface 115 of the cavity 114 and the back side of a flange 152 on the base member. A chamfered surface 151 on the front side of flange 152 cooperates with an inclined surface 113 within the cavity 114 to selectably seat the base member 150 within the housing 110 in one of six different stable positions. Compression spring 160 urges the end face of ferrule 140 through opening 111. The ferrule may be a glass, metal, ceramic or plastic cylinder having a narrow passageway (about 126 μm in diameter) through its central axis for receiving an end portion of an optical fiber. Preferably, the ferrule has an outer diameter of about 1.25 mm and a length of about 7.0 mm. In the construction of an optical cable 30, a thin glass fiber is typically coated with two layers of ultraviolet-curable materials (polyacrylate for example) for protection. The coated fiber is then covered with a thermoplastic having sufficient stiffness to preclude fiber buckling and is referred to as a buffered fiber 33. To withstand tensile forces that might otherwise fracture the buffered fiber, the cable is constructed with a load-bearing portion in the form of strength members 32 that surround the buffered fiber. Elongated slender polymeric fibers of high tensile strength, such as aramid yarn, are suitable for this purpose. An outer jacket 31 comprising polyvinyl chloride, for example, surrounds the buffered fiber and strength members to complete the construction of optical cable 30. These layers of different materials are all stripped from the end portion of the glass fiber prior to its insertion into ferrule 140. An adhesive is injected into the passageway through the central axis of ferrule 140. Then the uncoated portion of the optical fiber is inserted into the passageway of the ferrule and adhesively attached. The spring 160 is pre-compressed on the ferrule/base member subassembly 140/150 with cable, and is inserted into housing 110. Additionally, strength members 32 of the cable 30 are folded back around flange 25 of the strain-relief boot 20 and an adhesive is applied thereto. (A suitable adhesive for bonding the strength members to the connector is Hysol 151—a commercially available, two-part epoxy.) Flange 25 is then pressed into cavity 112 at the back end of housing 110 so that the cable jacket 31 and the strength members 32 are "sandwiched" between the flange and the sidewalls of cavity 112. Cover 100 is then snapped onto the housing. It is desirable that the cable 30 remain attached to connector 10 when an axial pull of at least 10 pounds is applied to cable 30.

Strain-relief boot 20 is about 38 mm long and is made from a suitably compliant material so that its back portion can be bent in a direction that is perpendicular to its central axis. Illustratively, the strain-relief boot is made from a thermoplastic rubber such as Santoprene® elastomer which is commercially available from Advanced Elastomer Systems, LP. Strain-relief boot 20 is conically shaped and tapers from a maximum diameter of about 5.6 mm at one end 22 to a minimum diameter of about 3.0 mm at the other end 24. Not only does the boot 20 provide strain relief for cable 30, but it also insures that the cable can withstand repeated bends after interconnection without undue stress being imparted to the glass fiber.

Figure 4:
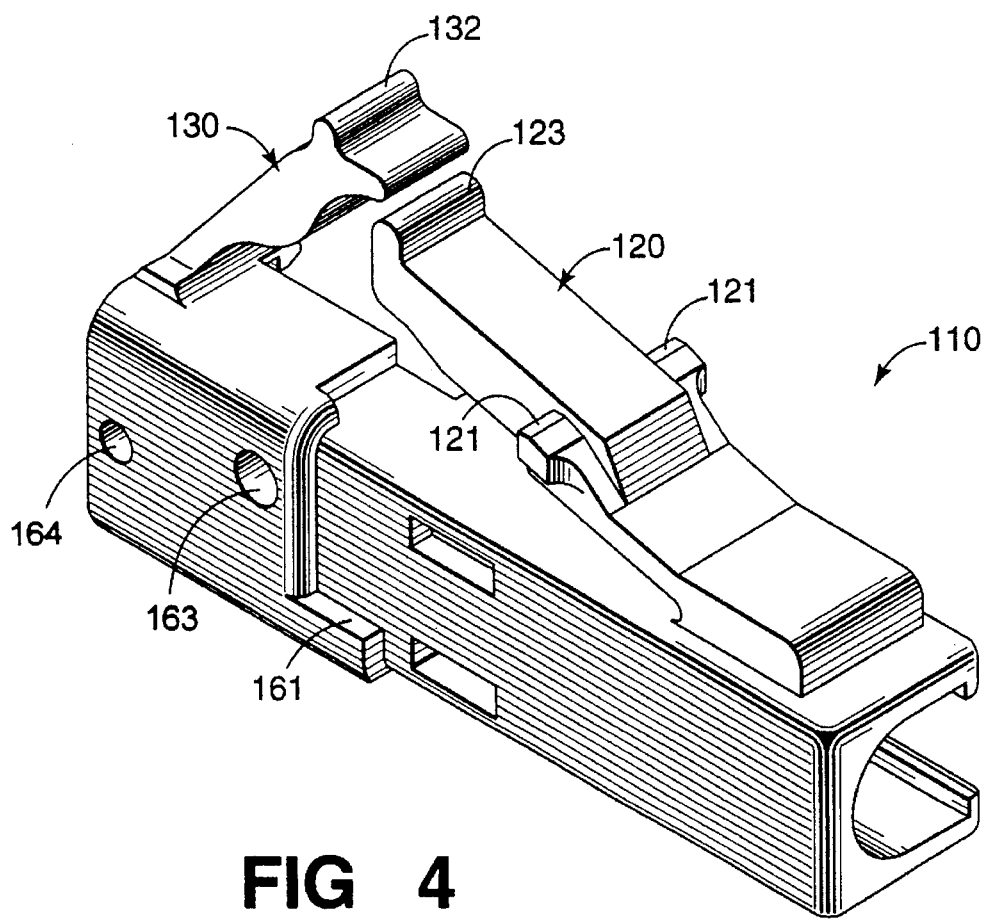
FIG. 4 is a front, top and right-side perspective view of a housing for the connector shown in FIG. 3.
Figure 5:
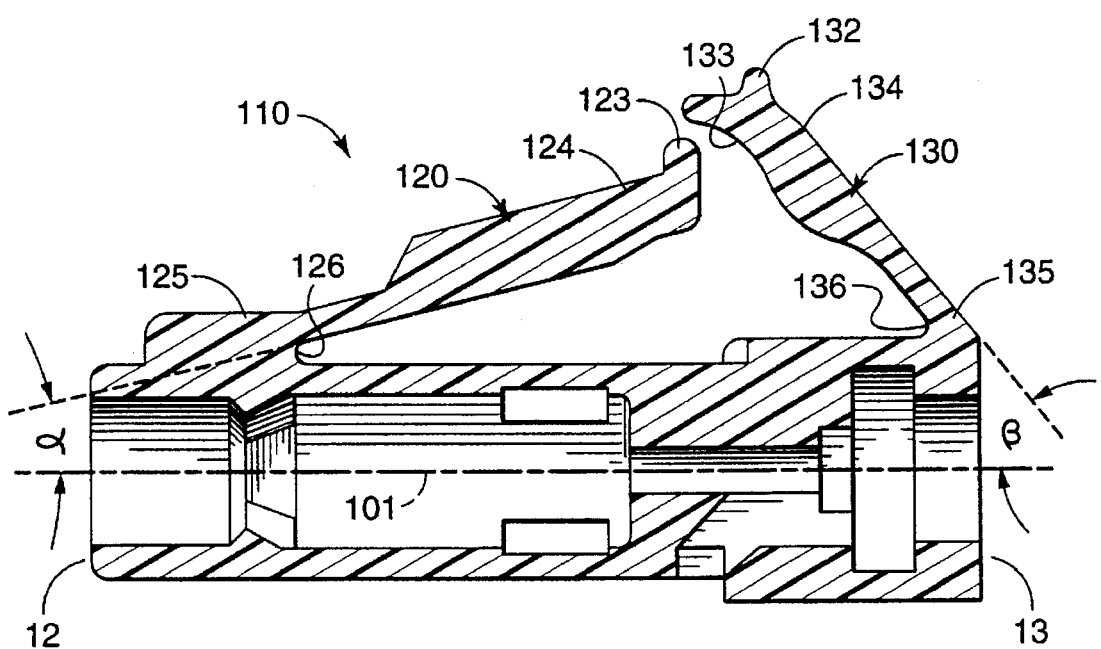
FIG. 5 is a cross-section view of the housing for the connector shown in FIG. 3.

It is desirable that latch 120 not snag other wires and cables when pulled through a concentrated area of same, and trigger 130 prevents such snagging. Moreover, trigger 130 makes latch 120 easier to use as discussed below. Referring now to FIG. 4 and 5, the cooperative relationship between latch 120 and trigger 130 is more fully explored. FIG. 4 is a front, top and right-side perspective view of housing 110; and FIG. 5 is a cross section view of the housing. Formed integrally with the dielectric housing 110 is a resilient latch which is designated generally by the numeral 120. The latch is approximately 2.3 mm wide, 9.0 mm long, and has a minimum thickness of about 0.65 mm. The latch 120 includes a pair of shoulders 121–121 which are positioned on its opposite sides. These shoulders are automatically deflected downward during insertion into an associated jack receptacle. Also formed integrally with the dielectric housing 110 is a resilient trigger which is designated generally by the numeral 130. The trigger is approximately 2.3 mm wide, 7.5 mm long, and has a minimum thickness of about 0.65 mm. Holes 163,164 are molded into the side of housing 110 so it can be easily joined to another optical connector in a duplex or higher-order assembly. A clip (not shown) includes several pairs of pins, one pair being inserted into holes 163, 164 and another pair being inserted into another connector. In order to maintain proper polarization of the connectors, the holes 163, 164 have different diameters and can only be attached to the clip in one particular orientation. A similar pair of holes 103, 104 is molded into the side of cover 100 (see FIG. 3) for the above-described purpose, and they also have different diameters. Housing 110 further includes a reinforcement ledge 161 which cooperates with a mating recess 461 (FIG. 2) within the associated jack receptacle to keep the optical connector 10 from moving when a side load is applied to the connector. A similar reinforcement ledge 102 is molded into the side of cover 100 (see FIG. 3) for the same purpose.

As best can be seen in FIG. 5, latch 120 comprises a cantilever beam having its fixed end 125 positioned toward the plug end of the housing 110, and its free end 124 positioned toward the cable-entrance end 13 of same. Latch 120 is molded so that its longitudinal axis is oriented at an angle α (approximately 15°) with respect to the central axis 101 of the housing 110. The region 126 where the latch meets the top surface of the housing has a radius of curvature of approximately 0.25 mm. Trigger 130 comprises a cantilever beam having its fixed end 135 positioned toward the cable-entrance end 13 of the housing 110, and its free end 134 positioned toward the plug end 12 of same. The free end of the trigger includes a protruding surface 132 that assists in operating the trigger. Surface 132 enhances the manual operation of the trigger 130, enabling it to be easily operated in a high density application, either manually or with the tip of a pen. Optionally, surface 132 includes a plurality of ridges. Trigger 130 is molded so that its longitudinal axis is oriented at an angle β (approximately 50°) with respect to the central axis 101 of housing 110. The region 136 where the trigger meets the top surface of the housing has a radius of curvature of approximately 0.25 mm. The bottom side of trigger 130 includes a camming surface 133 which slides along a surface 123 of the latch 120 when the trigger is pressed downward. As the trigger is pressed downward toward the central axis 101 of the housing, so too is the latch. It is an advantage of the present invention that the use of such a trigger effectively extends the length over which the latch may be operated. Additionally because the user is reaching toward the housing 110 from the cable entrance end thereof, it is an advantage that the user's fingers push toward the housing to operate the trigger, and hence the latch. So that these surfaces will engage each other properly, the trigger is positioned above, and overhangs, the latch. And although camming surface 133 is preferably shaped like the letter "S," it is understood that other shapes are effective in the practice of the invention.

Reference is now made to FIG. 6, 7. The combined height, thickness and resiliency of latch 120 facilitates insertion of connector 10 into a jack receptacle 60. After insertion, the latch 120 essentially resumes its original molded shape and orientation because of its natural resilience. Of particular interest is latch 120 which moves downward while being inserted into a simplex jack receptacle 60, but then springs back (upwardly) after insertion is complete. The downward movement of the latch is caused by interference (during insertion) between shoulder 121 on the latch and a tapered surface within the receptacle. Thereafter, vertical surface 632 within the receptacle interacts with vertical surface 122 on the shoulder 121 of the latch 120 to lock the connector 10 into the receptacle 60. As best shown in FIG. 7, removal of the connector 10 from the jack receptacle 60 is easily accomplished by depressing trigger 130, which engages latch 120 and moves it downward toward the central axis of the connector, and then pulling cable 30 or strain-relief boot 20. Protruding surface 132 enables one to use their fingernail in removing the connector from the receptacle. Note that the ability to manually depress latch 120 is materially enhanced by the use of trigger 130.

Typically, a pair of identical receptacles 60—60 are joined back-to-back by attaching their flanges 612 together to form a coupling. The coupling can then be inserted into a panel as generally shown in FIG. 2. Pin 623 in one receptacle mates with a corresponding hole (not shown) in the other receptacle, and assures proper alignment. Nevertheless, so that the ferrules 140 within the connectors are perfectly aligned, specially designed alignment sleeves (not shown) are installed in cylindrical openings 622 before the receptacles are joined. Suitable alignment sleeves, made from metal, ceramic or even plastic material, are well known in the art and are not discussed further. A panel-mounting latch 610 is positioned on the top and bottom sides of receptacle 60, and includes a tapered surface 611 for capturing panels of different thickness between the tapered surface and flange 612.

Figure 8A:
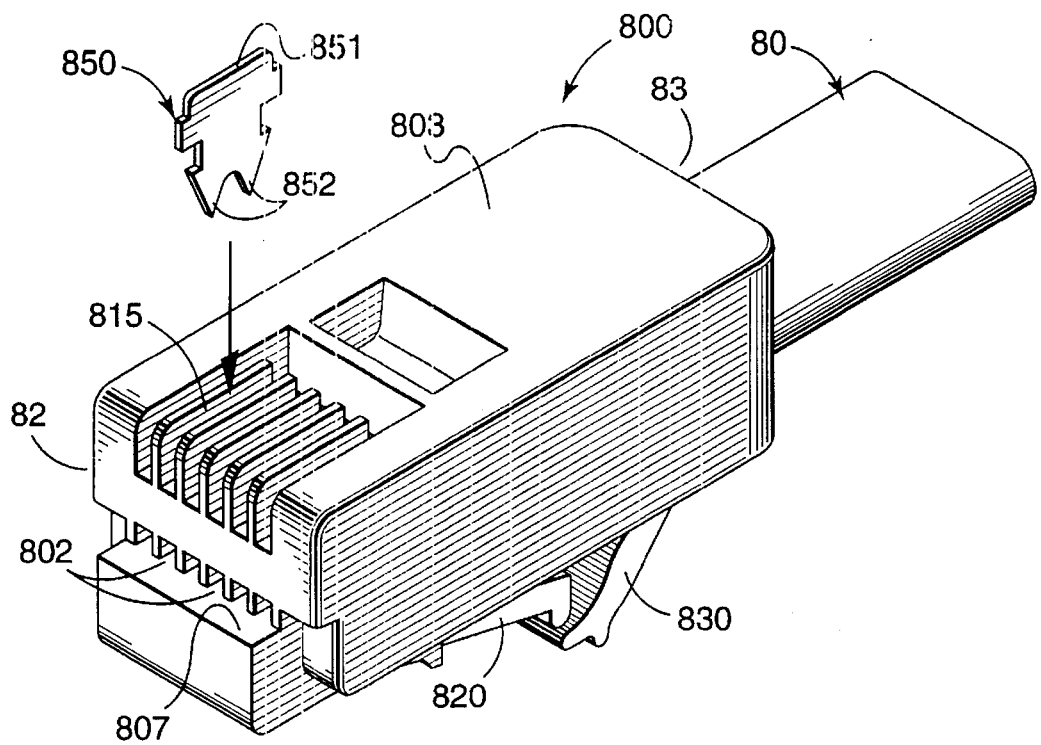
FIG. 8A is a front, bottom and left-side perspective view of an alternate embodiment in which the connector comprises a plug that terminates an electrical cable and includes an anti-snag latch assembly.
Figure 8B:
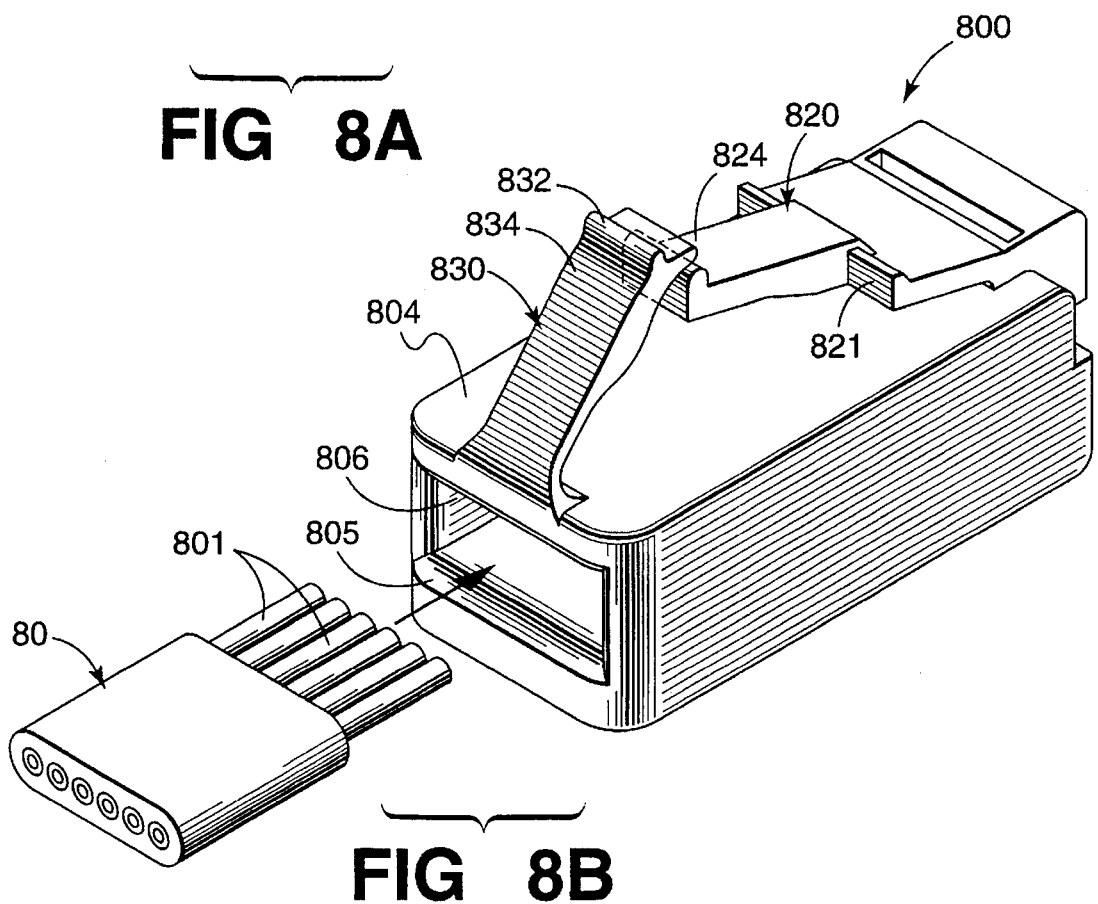
FIG. 8B is a rear, top and right side perspective view of the alternate embodiment shown in FIG. 8A.

FIG. 8A–8B disclose front and rear perspective views of an alternate embodiment of the present invention in which the anti-snag feature is applied to an electrical connector and, more particularly, is applied to an R J-type modular plug. And while a brief description of the construction and operation of such an electrical connector is included for clarity, greater detail is provided in U.S. Pat. No. 3,860,316 which is hereby incorporated by reference.

A rigid, dielectric housing, designated generally by the numeral 800, is designed to be easily molded by using conventional injection-molding techniques. Housing 800 has a free end 82, a cord-input end 83, and a terminal-receiving side 803. The housing is formed with a cord input aperture 805 which circumscribes the end portion of cord 80 which extends therethrough.

The aperture 805 has a flared entrance which protects cord 80, increases its life, and facilitates insertion. The aperture opens into a cavity 806 which partially terminates in a ledge 807 at the free end 82 of the housing. Illustratively, housing 800 is a unipartite structure in which the interior cavity is formed during molding a substantially encloses an end portion of the cord which is inserted into the aperture. As best can be seen in FIG. 8A, a plurality of conductor-receiving troughs 802—802 are designed to receive associated ones of the conductors 801—801. The center-to-center distance between troughs is, illustratively, 1.0 mm (0.040 inches). The bottoms of troughs 802—802 are substantially coplanar with the top surface of ledge 807 at the free end 82. This facilitates the use of the ledge as an anvil for conductor cut-off during assembly of the housing 800 to the cord 80.

The terminal-inserting side 803 of the housing is primarily shown in FIG. 8A and, illustratively, includes six slots, each slot 815 receiving a conductive terminal 850 made from a resilient material such as phosphor bronze. Each terminal 850 includes one contact portion 851 for making electrical contact external to the housing, and another contact portion 852 that extends into trough 802 for piercing the insulation of a conductor 801 residing therein, and making electrical engagement with an internal copper wire. Contact portion 852 illustratively comprises a plurality of tangs. Terminal-receiving slots 815 each include an opening (not shown) which extends into an associated conductor-receiving trough 802.

Figure 9:
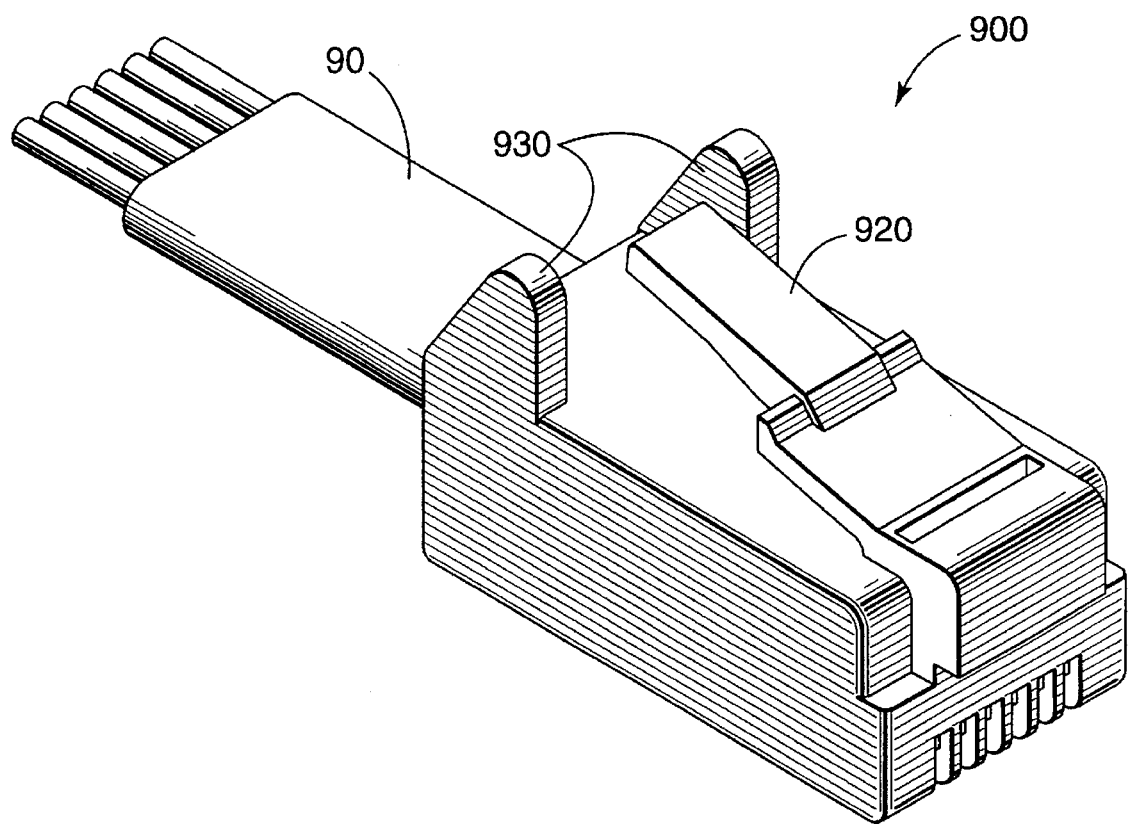
FIG. 9 shows a front, top and right-side perspective view of a prior art electrical connector having anti-snag features.

The latching side 804 of the housing is primarily shown in FIG. 8B and includes a latch 820 and a trigger 830. These are cantilever beams whose fixed ends are located at opposite ends of the housing 800, and whose free ends are generally in the center of the housing. When a user depresses the free end 834 and pulls rearwardly on surface 832 of the trigger 830, its underside presses against the free end 824 of the latch 820 and moves it downward—thereby moving locking shoulder 821 so that the housing 800 can be withdrawn from a jack receptacle into which it may be inserted. Ppior Art FIG. 9 discloses a front, top and right-side perspective view of a prior art electrical connector 900 having anti-snag features. In particular, an RJ-type modular plug is disclosed having a pair of rigid sidewalls 930 integrally molded into the housing. Such a plug is incidentally shown in U.S. Pat. No. 4,611,875 issued on Sep. 16, 1986 to Clarke et al. The sidewalls are tapered toward the cord-input end so that when it is pulled by the cord 90, its locking tab 920 will not snag other wires and cables along its path. The sidewalls need to be about the same height as the free end of tab 920 to prevent snagging. However, this tends to make the tab somewhat difficult for a user to manually operate, which is particularly true for smaller connectors.

Although a particular embodiment of the present invention has been shown and described, various modifications are possible within the spirit and scope of the invention. These modifications include, but are not limited to, the use of different materials in the construction of a connector. For example, although polycarbonate is preferred, the use of other thermoplastic materials and blends thereof is possible. And while male connectors are shown, it is clearly possible to incorporate the present invention into female connectors as well.

We claim:

1. A connector for terminating a cable containing a transmission medium, the connector having (i) a plug end for insertion into a mating receptacle, (ii) a cable-entrance end for receiving the cable, (iii) a central axis that extends between the plug end and the cable-entrance end, and (iv) a latch for securing the connector to the receptacle; said latch comprising a cantilever mounted on an outside surface of the connector, the fixed end of the latch being positioned toward the plug end of the connector and the free end of the latch extending toward the cable-entrance end of the connector, said latch being movable toward the central axis CHARACTERIZED BY:

a trigger for engaging the free end of the latch to release the connector from the receptacle, the trigger comprising a cantilever mounted on the outside surface of the connector, the fixed end of the trigger being positioned toward the cable-entrance end of the connector and the free end of the trigger extending toward the plug end of the connector, the free end of the trigger slidably engaging the free end of the latch to move it toward the central axis, the trigger forming an acute angle β with the central axis that points in a direction away from the plug end of the connector toward the cable entrance end thereof.

2. The connector of claim 1 wherein the transmission medium comprises an optical fiber.

3. The connector of claim 1 wherein the connector is molded from a thermoplastic material, said fixed ends of the trigger and latch being hinged to the connector by sections of the thermoplastic material which are suitably thin to withstand repeated flexing without breaking.

4. The connector of claim 3 wherein the thermoplastic material includes polycarbonate.

5. A connector for terminating an optical fiber comprising:

a fiber-holding structure for receiving an end portion of the optical fiber in an axial passageway that terminates in an end face;

a housing having internal surfaces that define a cavity and surround the fiber-holding structure, the housing including a first opening for receiving the optical fiber and a second opening for enabling the end face of the holding structure to protrude therethrough, said openings extending into the cavity and being positioned at opposite ends of the housing;

a latch comprising a cantilever having a locking member for securing the housing to an associated receptacle, the latch being mounted on a side surface of the housing with its fixed end toward the second opening of the housing and its free end being movable in a direction toward the axial passageway; and a trigger comprising a cantilever mounted on the side surface of the housing with its fixed end toward the first opening of the housing and its free end extending toward the second opening of the housing, the free end of the trigger slidably engaging the free end of the latch when moved toward the axial passageway, said trigger forming an acute angle β with the axial passageway that points in a direction away from the second opening of the connector toward the first opening.

6. The connector of claim 5 wherein the fiber-holding structure includes a spring member which interacts with the housing to urge said end face through the second opening in the housing.

7. The connector of claim 5 wherein the fiber-holding structure comprises a cylindrical plug that includes the end face in which the associated fiber is to terminate and an axial passageway which terminates in said end face, said passageway being adapted to receive an uncoated end portion of the associated fiber; and a base member for holding an end portion of the plug, said base member including an axial passageway which is collinear with the axial passageway of the plug.

8. The connector of claim 6 further including an annular spring which is disposed about the base member and which presses against a flange thereof, said spring also pressing against one of the internal surfaces of the cavity.

9. The connector of claim 5 wherein the housing comprises first and second interlocking members, the first interlocking member being generally U-shaped with a channel for receiving the fiber-carrying structure, the second interlocking member being generally flat and shaped to mate with the first part, said first and second interlocking members substantially enclosing the fiber-holding structure when they are joined together.

10. The connector of claim 5 wherein the first and second interlocking members comprise thermoplastic material.

11. In combination, an optical cable and a connector, the optical cable comprising a glass fiber enclosed within a plastic buffer material; and the connector comprising (i) a fiber-holding structure having an axial passageway which receives the optical fiber and which terminates in a planar end face that is perpendicular to the passageway, (ii) a housing having internal surfaces that define a cavity and surround the fiber-holding structure, the housing including a first opening at its back end which receives the optical cable and a second opening at its front end that enables the end face of the fiber-holding structure to protrude therethrough, said openings extending into the cavity and being positioned at opposite ends of the housing, (iii) a latch for securing the housing to an associated receptacle to preclude unintended decoupling therebetween, said latch being positioned on a single side surface of the housing and movable in a direction which is perpendicular to the axial passageway, and (iv) a trigger comprising a cantilever mounted on the side surface of the housing with its fixed end toward the first opening of the housing and its free end extending toward the second opening of the housing, the free end of the trigger slidably engaging the free end of the latch when moved toward the axial passageway, said trigger forming an acute angle β with the axial passageway that points in a direction away from the second opening of the connector toward the first opening.

12. The combination of claim 11 wherein the optical cable further comprises a plurality of filamentary strength members surrounding the buffered fiber and a plastic jacket surrounding the filamentary strength members.

13. The combination of claim 12 further including a strain-relief boot having a central passageway which holds the optical cable, a front portion of the strain-relief boot surrounding the back end of the housing and capturing the filamentary strength members of the optical cable therebetween; whereby tensile forces applied to the optical cable are transferred to the connector.

14. In combination, a cable joined to a connector, the cable comprising a transmission medium enclosed within a protective jacket; and the connector comprising a housing having a cable-entrance end, a plug end, and a central axis that extends therebetween, said housing including: (i) a cantilever latch mounted on its outside surface for interlocking with a receptacle, the fixed end of the cantilever latch being positioned toward the plug end of the housing and the free end of the cantilever latch extending toward the cable-entrance end of the housing, and (ii) a cantilever trigger mounted on the outside surface of the housing for deflecting the free end of the latch downward toward the central axis to release the housing from the receptacle; the fixed end of the cantilever trigger being positioned toward the cable-entrance end of the housing and the free end of the cantilever trigger extending toward the plug end of the housing, the free end of the trigger including a camming surface for slidably engaging the free end of the latch to move it downward, the cantilever trigger forming an acute angle β with the central axis that points in a direction away from the plug end of the housing toward the cable entrance end.

15. A jumper comprising a communications cable terminated in a plug at each end;

the communications cable including a signal transmission medium enclosed within a dielectric jacket; and at least one of the plugs comprising a housing having a cable-entrance end, a connecting end, and a central axis that extends therebetween, said housing including: (i) a cantilever latch mounted on its outside surface for interlocking with a receptacle, the fixed end of the cantilever latch being positioned toward the connecting end of the housing and the free end of the cantilever latch extending toward the cable-entrance end of the housing, and (ii) a cantilever trigger mounted on the outside surface of the housing for deflecting the free end of the latch downward toward the central axis to release the housing from the receptacle; the fixed end of the cantilever trigger being positioned toward the cable-entrance end of the housing and the free end of the cantilever trigger extending toward the connecting end of the housing, the free end of the trigger including a camming surface for slidably engaging the free end of the latch to move it downward, the cantilever trigger forming an acute angle β with the central axis that points in a direction away from the connecting end of the housing toward the cable entrance end.

16. The jumper of claim 15 wherein the signal transmission medium comprises a light-carrying fiber.

* * * * *